United States Patent
Frankenberger (10) Patent No.: US 12,030,060 B2
(45) Date of Patent: Jul. 9, 2024

(54) TREATMENT DEVICE AND METHOD

(71) Applicant: FSM Frankenberger GmbH, Berlin (DE)

(72) Inventor: Guido Frankenberger, Wetzlar (DE)

(73) Assignee: FSM Frankenberger GmbH, Berlin (DE)

( * ) Notice: Subject to any disclaimer, the term of this patent is extended or adjusted under 35 U.S.C. 154(b) by 0 days.

(21) Appl. No.: 18/102,942

(22) Filed: Jan. 30, 2023

(65) Prior Publication Data

US 2023/0241622 A1 Aug. 3, 2023

(51) Int. Cl.
| | | |
|---|---|---|
| B03B 5/58 | (2006.01) | |
| B03B 11/00 | (2006.01) | |
| C02F 1/00 | (2023.01) | |
| C02F 101/10 | (2006.01) | |
| C02F 101/30 | (2006.01) | |

(52) U.S. Cl.
CPC ............... *B03B 5/58* (2013.01); *B03B 11/00* (2013.01); *C02F 1/00* (2013.01); *B03B 2011/008* (2013.01); *C02F 2001/007* (2013.01); *C02F 2101/10* (2013.01); *C02F 2101/30* (2013.01); *C02F 2303/24* (2013.01)

(58) Field of Classification Search
CPC ..... B03B 5/58; B03B 11/00; B03B 2011/008; C02F 1/00; C02F 2001/007; C02F 2101/10; C02F 2101/30; C02F 2303/24
See application file for complete search history.

(56) References Cited

U.S. PATENT DOCUMENTS

2021/0171367 A1* 6/2021 Murphy ................. B01D 21/34

FOREIGN PATENT DOCUMENTS

| DE | 19501034 | 7/1996 |
|---|---|---|
| DE | 19729802 | 1/1999 |
| DE | 19953961 | 5/2001 |

OTHER PUBLICATIONS

Machine Translation of DE 199 53 961 A1, Google Patents.
Machine Translation of DE 197 29 802 C2, Google Patents.
Machine Translation of DE 195 01 034 A1, Google Patents.

* cited by examiner

*Primary Examiner* — Jacob S. Scott
*Assistant Examiner* — Miraj T. Patel
(74) *Attorney, Agent, or Firm* — Warren D. Schickli; Stites & Harbison PLLC (57) ABSTRACT

A treatment device for treating a mixture of at least a liquid, organic solids and inorganic, mineral solids, includes a container for receiving the mixture. The container tapers in a funnel shape in a direction of a longitudinal axis of the container. An inlet tangentially supplies the mixture to the container. An outlet discharges the liquid essentially containing the organic solids from the container. A discharge apparatus serves for discharging the inorganic, mineral solids. The treatment device also includes a sleeve adapted to guide the mixture between an outer wall of the sleeve and an inner wall of the container and to guide the liquid containing the organic solids within an inner wall of the sleeve for discharge from the outlet.

20 Claims, 8 Drawing Sheets

TREATMENT DEVICE AND METHOD

This application claims priority to German Patent Application No. 10 2022 102 477.6, filed Feb. 2, 2022, the entirety of the contents of which is incorporated by reference herein.

TECHNICAL FIELD

The invention relates to a treatment device and to a method for treating a mixture made up of at least a liquid, organic solids and inorganic, mineral solids, in particular for separating inorganic, mineral solids contaminated with organic solids from a liquid, the treatment device comprising a container for receiving the mixture, the container being formed so as to taper in a funnel shape in a direction of a longitudinal axis of the container, the container having an upper area, in which an inlet of the treatment device situated on the outside in a radial direction with respect to the longitudinal axis for tangentially supplying the mixture to the container and an outlet of the treatment device for discharging the liquid essentially containing the organic solids from the container are provided, a center area disposed adjacent to the upper area in the direction of the longitudinal axis and a lower area disposed adjacent to the center area in the direction of the longitudinal axis for forming a deposit of essentially the inorganic, mineral solids, and the treatment device comprising a discharge apparatus which is tethered to the lower area and serves for discharging the inorganic, mineral solids forming the deposit.

BACKGROUND

A treatment device of the type mentioned above is known sufficiently from the state of the art and is used in the form of a grit grader or grit classifier for example in wastewater treatment plants to separate sand contaminated with organic solids from a sand-water mixture. For this purpose, the sand-water mixture is supplied to the container by means of the inlet. Via a guided course in the container, the organic solids are suspended and supplied to the outlet while the sand settles in the container. Subsequently, the sand is drained and discharged from the container with the aid of the discharge apparatus. While the task of a grit grader is generally limited to discharging sand with the sand being as dry as possible, a sand classifier commonly has the additional task of treating the sand to reduce a portion of the organic solids contained in the sand. For this purpose, the settled sand is separated from remaining organic solids in the container in an upflow method with the aid of a stirring apparatus before being discharged, for example by adding water.

The treatment devices known from the state of the art are commonly designed for a separation performance of 95% for a grit size of 200 µm or larger. A separation performance of this kind often is not sufficient enough in practice since the sand introduced in a wastewater treatment plant can also have a grit size of less than 200 µm. Sand traps, which are commonly switched upstream of treatment devices, have been improved to a separation performance of 95% for a grit size of approximately 100 µm and larger for this reason. Consequently, demand exists for designing the treatment devices for a separation performance of 95% for a grit size of approximately 100 µm and larger too. It is common knowledge that this improved separation performance can be attained by a loading being reduced by a factor of 5 to 6. Accordingly, a treatment device which is designed for a separation performance of 95% for a grit size of 200 µm and larger at a loading of 30 l/s must be subjected to a loading of 5 l/s in order to attain an improved separation performance of 95% for a grit size of approximately 100 µm and larger. A reduction of the loading in this manner, however, is disadvantageous and commonly not even possible with known treatment devices.

Furthermore, DE 197 29 802 C2 discloses a generic treatment device which additionally comprises a helical guide apparatus, which is disposed on the upper area of the container, extends in the direction of the longitudinal axis and is designed to guide the mixture from the inlet to a funnel-like drain channel of the treatment device, which is tethered to the outlet, forms an overflow weir and is disposed centrally in the upper area, coaxially to the longitudinal axis. For this purpose, the guide apparatus is disposed at a mixture surface or liquid surface. By means of the guide apparatus, floating solids are to be guided in one direction of the outlet disposed centrally in the upper area, a separation performance of the treatment device is to be improved and a direct flow of the mixture in one direction of the drain channel or overflow weir disposed centrally in the upper area is to be prevented.

A disadvantage of the treatment device known from the state of the art is that the mixture flows into the container at a comparatively high flow speed, which results in strong turbulences and thus impedes settling the sand. Furthermore, the outlet, which is disposed centrally and is tethered to the drain channel disposed centrally in the upper area, poses a disturbance source which additionally leads to comparatively large turbulences impeding settling the sand. Add to this that a length of the overflow weir is comparatively short due to the central position and the funnel-like design, which in turn leads to a comparatively high overflow height or weir-edge load and thus to a comparatively high flow speed in an area before the overflow weir. A position and length of the overflow weir is thus not chosen optimally. Furthermore, practice has shown that the helical design of the guide apparatus is disadvantageous as, after being supplied to the container, most of the mixture in the container flows outward in the radial direction, downward in the direction of the longitudinal axis to the center area, and the liquid containing the organic solids then flows in the center area inward in the radial direction, in the opposite direction of the direction of the longitudinal axis to the upper area and the overflow weir.

SUMMARY

The object of the invention at hand is therefore to propose a treatment device and a method for treating a mixture made up of at least a liquid, organic solids and inorganic, mineral solids, the treatment device and the method both overcoming the disadvantages of the treatment devices known from the state of the art and enabling attaining an improved sand removal.

This object is attained by a treatment device having the features of claim 1 and by a method having the features of claim 16.

The treatment device according to the invention for treating a mixture made up of at least a liquid, organic solids and inorganic, mineral solids, in particular for separating inorganic, mineral solids contaminated with organic solids from a liquid, comprises a container for receiving the mixture, the container being formed so as to taper in a funnel shape in a direction of a longitudinal axis of the container, the container having an upper area, in which an inlet of the treatment device situated on the outside in a radial direction with respect to the longitudinal axis for tangentially supplying the mixture to the container and an outlet of the treatment device for discharging the liquid essentially containing the organic solids from the container are provided, a center area disposed adjacent to the upper area in the direction of the longitudinal axis and a lower area disposed adjacent to the center area in the direction of the longitudinal axis for forming a deposit made of essentially the inorganic, mineral solids, and the treatment device comprising a discharge apparatus which is tethered to the lower area and serves for discharging the inorganic, mineral solids forming the deposit, the treatment device comprising a sleeve, which is disposed in the upper area, extends in the direction of the longitudinal axis, forms a guide apparatus, is open to both sides and is configured to guide the mixture, which has been guided to the container via the inlet, between an outer wall of the sleeve and an inner wall of the container from the upper area to the center area and to guide the liquid containing the organic solids from the center area to the upper area by at least partially traversing an interior of the sleeve limited by an inner wall of the sleeve for being discharged from the outlet.

According to the invention, a sleeve is provided in the upper area, the sleeve forming a guide apparatus, being open to both sides and being designed to guide the mixture, which is supplied to the container via the inlet, between an outer wall of the sleeve and an inner wall of the container from the upper area to the center area. Consequently, a flow of the mixture can be made more constant between the outer wall of the sleeve and the inner wall of the container and a flow speed of the mixture can be reduced, owing to which disadvantageous turbulences impeding settling the inorganic, mineral solids can be prevented. In other words, an area of the container formed between the outer wall of the sleeve and the inner wall of the container can form a kind of calming area for the mixture supplied to the container, meaning the mixture subsequently can flow downward to the center area of the container in the direction of the longitudinal axis at a reduced flow speed. In the center area, the liquid containing the organic solids can distribute across an entire diameter of the center area above the sediment or settled inorganic, mineral solids, in particular sand, in the opposite direction of the direction of the longitudinal axis. After, the liquid containing the organic solids can flow constantly upward, inward in the radial direction in the center area, in the opposite direction of the direction of the longitudinal axis. Simultaneously, the sleeve is designed to guide the liquid containing the organic solids out of the outlet from the center area to the upper area, the liquid containing the organic solids at least partially traversing an interior of the sleeve limited by the inner wall of the sleeve. Furthermore, the sleeve can prevent a direct flowing of the mixture from the inlet in a direction of the outlet and can restrain the mixture flowing downward radially outward in the direction of the longitudinal axis from the liquid containing the organic solids and flowing upwards radially inward in the opposite direction of the direction of the longitudinal axis. As a result the guide apparatus adapted to the actual flow behavior of the mixture or to the liquid containing the organic solids ensures that turbulences and comparatively large flow speeds of the mixture or of the liquid containing the organic solids can be prevented, meaning sand removal of the treatment device can be significantly improved.

The mixture can in particular be a sand-water mixture. The inorganic, mineral solids can in particular be sand.

The discharge apparatus can comprise a discharge screw and drive means. By means of the screw conveyor, the inorganic, mineral solids can be drained and discharged from the container. Further, the discharge apparatus can have a drop channel, preferably at the end, by means of which the inorganic, mineral solids can be dropped. A collecting container for receiving the inorganic, mineral solids freed of organic solids can be disposed below the drop channel. A liquid, in particular water, can be added to the inorganic, mineral solids forming the deposit or already settled for separating remaining organic solids, the liquid being able to reach the center area of the container via another inlet of the treatment device disposed in the center area of the container.

The container can be disposed on a frame.

The tangential supply of the mixture to the container can additionally prevent turbulences.

The inlet can have an inlet flange. Furthermore, the outlet can have an outlet flange.

The term sleeve is understood to be a body which is preferably axially symmetrical to the longitudinal axis and is hollow on the inside along the longitudinal axis of the body.

The sleeve is open on both sides. Consequently, the sleeve can have an opening of the sleeve on one end of the sleeve and another opening of the sleeve opposite the opening on another end of the sleeve opposite the end, the openings being able to limit the interior of the sleeve together with the inner wall of the sleeve. A longitudinal axis of the sleeve can penetrate the opening and the further opening. The interior can form a passage of the sleeve. Preferably, a thickness of the sleeve, i.e., a distance between the inner wall of the sleeve and an outer wall of the sleeve, is comparatively slim. Furthermore, a diameter of the sleeve, i.e., a dimension perpendicular to the longitudinal direction of the sleeve, can be comparatively large with respect to a height of the sleeve, i.e., a dimension in the longitudinal direction of the sleeve.

The container can comprise a cylindrical section on the end in the opposite direction of the direction of the longitudinal axis and a frustoconical section disposed adjacent to the cylindrical section in the longitudinal direction. The sleeve can be disposed in the container so as to overlap with the cylindrical section and the frustoconical section. Equally, it is possible to dispose the sleeve on a level with the cylindrical section or with the frustoconical section. The discharge apparatus can be disposed adjacent to or below the frustoconical section in the direction of the longitudinal axis. Nevertheless, it is also possible for the container to be formed conically or frustoconically on one end in the opposite direction of the direction of the longitudinal axis. A cone shape or frustum shape can then extend to an upper edge of the container.

Advantageously, the container can be axially symmetrical with respect to the longitudinal axis and have a circular cross section.

The sleeve can be conical or in the shape of a cone.

Advantageously, the sleeve can be formed so as to taper or have the shape of a hollow frustum in the direction of the longitudinal axis. Consequently, a shape of the sleeve can be adapted to the funnel shape of the container, meaning the outer wall of the sleeve can extend at least partially parallel to the inner wall of the container, meaning the mixture can be optimally guided between the outer wall of the sleeve and the inner wall of the container. An opening angle of the sleeve can be chosen to match an opening angle of the container. Generally, the sleeve can, however, have a different shape. The sleeve can be hollow-cylindrical, for instance. The shape of the sleeve can be adapted to a shape of the container and to a position of the sleeve in the container. In particular, a cross-sectional shape of the sleeve can be adapted to a cross-sectional shape of the container.

Advantageously, the sleeve and the container can be disposed coaxially to one another with respect to the longitudinal axis. Nevertheless, the sleeve can be disposed in such a manner in the container that the longitudinal axis of the sleeve is spaced apart from the container in the radial direction and extends parallel to the longitudinal axis of the container. Equally, the longitudinal axis of the sleeve can be inclined about an angle with respect to the longitudinal axis of the container. Advantageously, the longitudinal axis of the sleeve aligns flush with the longitudinal axis of the container.

Advantageously, the inlet can be disposed on a level with the sleeve. The mixture supplied to the container can thus directly reach the calming area formed between the outer wall of the sleeve and the inner wall of the container. Simultaneously, the tangential supply of the mixture to the container can ensure that the mixture does not flow in the opposite direction of the outer wall of the sleeve head-on, whereby additional turbulences can be prevented.

Advantageously, the inlet can be disposed adjacent to the outlet in the direction of the longitudinal axis. In other words, the outlet can be disposed above the inlet.

Furthermore, the outlet can be disposed on the outside in the radial direction. Owing to the fact that the outlet is not disposed centrally in the upper area, as is the case with the treatment device known from the state of the art, turbulences can be additionally prevented. Moreover, the outlet can be disposed at an offset to the inlet at an angle of preferably 90° in an azimuthal direction with respect to the longitudinal direction. Generally, the angle can be adequately chosen.

Advantageously, the sleeve can abut in the opposite direction of the inner wall of the container from the outside in the radial direction, preferably in a liquid-tight manner, with an end of the sleeve in the opposite direction of the direction of the longitudinal axis. In other words, no gap is formed between the inner wall of the container and the end of the sleeve. This can prevent the liquid flowing from the center area to the upper area and containing the organic solids from returning to the inlet area and/or the calming area as it flows over the end of the sleeve, after the liquid has completely traversed the interior of the sleeve. Hence, the sleeve can abut tightly from the outside and in a liquid-tight manner in the opposite direction of the inner wall of the container with the end disposed in the opposite direction of the direction of the longitudinal axis. The outlet can then be disposed adjacent to the sleeve, i.e., above the sleeve, in the opposite direction of the longitudinal direction. Equally, the at least partial, liquid-tight abutment of the sleeve in the opposite direction of the container prevents the untreated mixture from reaching an area above the sleeve where the outlet can be disposed. If the sleeve is conical or hollow-frustoconical in shape and is disposed in the container so as to overlap the cylindrical section of the container and the frustoconical section of the container, the end of the sleeve in the opposite direction of the longitudinal axis can quasi automatically meet the inner wall of the container in the radial direction and abut in the opposite direction of it, preferably in a liquid-tight manner. An opening angle of the sleeve or of the cone or of the hollow frustum can then be chosen to match an opening angle of the frustoconical section of the container. Generally, a gap formed between the inner wall of the container and the end of the sleeve depending on the shape and position of the sleeve can, however, be closed with suitable means, for example using an annular element. Equally, it is possible to reach a cap of the gap by choosing a larger opening angle of the sleeve than the opening angle of the container. Moreover, it is also possible to dispose the sleeve in such a manner in the container that the end of the sleeve is above a liquid level formed in the container.

Advantageously, the treatment device can comprise an outlet drain, which is at least partially disposed in the sleeve, is tethered to the outlet and can form an overflow weir. The liquid containing the organic solids can then reach the outlet drain and from there the outlet via the overflow weir.

The drain channel can protrude over the sleeve in the opposite direction of the direction of the longitudinal axis.

In an advantageous embodiment of the invention, the drain channel is essentially an annulus.

Advantageously, a diameter of the outlet drain is smaller than a diameter of the sleeve, the outlet drain being able to form the overflow weir on both sides. In this context, an edge around an outer circle of the annulus can form a first overflow weir and an edge around an inner circle of the annulus can form a second overflow weir. This considerably increases the length of the overflow weir which in turn can result in a comparatively small overflow height or weir-edge load, which can keep the flow speed of the liquid containing the organic solids before a weir edge low and does not cause great changes of a mixture level or liquid level formed in the container even at varying inlet amounts. This embodiment is particularly advantageous and in particular allows attaining a sand removal of 95% for a grit size of approximately 100 µg and larger at an essentially unchanged loading. Generally, a treatment device can be used which is known from the state of the art and has been equipped with the guide apparatus and outlet drain according to the invention. Further laborious constructive changes are no longer required.

Advantageously, the outlet drain and the container can be disposed coaxially to one another with respect to the longitudinal axis. Generally, however, a longitudinal axis of the drain channel can also be spaced apart from the longitudinal axis of the container and be parallel thereto. Advantageously, the container, the drain channel and the sleeve can be disposed coaxially to one another with respect to the longitudinal axis.

Moreover, the drain channel can have a, preferably arc-shaped, guide element in an area of the drain channel, which is tethered to the outlet, the guide element being able to be designed to guide the liquid containing the organic solids to the outlet from the drain channel. If the drain channel is essentially an annulus, the drain channel can have two arc-shaped guide elements which can ensure that the liquid, which contains the organic solids and flows from a first half of the annulus towards an outlet, cannot flow out to a second half of the drain channel via the area of the drain channel tethered to the outlet but instead can be directly guided to the outlet. Thus, an outlet amount can be advantageously increased.

Advantageously, the treatment device can comprise a stirring apparatus having a stirring element carrier, preferably aligned flush with the longitudinal axis, and at least one stirring element disposed on the stirring element carrier in the lower area. Furthermore, the stirring apparatus can comprise drive means. By means of the stirring apparatus and an additional supply of a liquid, in particular water, the inorganic, mineral solids can be separated from the remaining organic solids in an upflow method. Advantageously, the stirring elements can be formed like paddles.

The treatment device can advantageously be a grit grader or grit classifier.

Further advantageous embodiments of the treatment device are derived from the description of features of the dependent claims referring to method claim 16.

In the method according to the invention for treating a mixture made up of at least a liquid, organic solids and inorganic, mineral solids, in particular for separating inorganic, mineral solids contaminated with organic solids from a liquid, by means of a treatment device, the mixture is received in a container of the treatment device, the container being formed so as to taper in a funnel shape in a direction of a longitudinal axis of the container, the mixture being tangentially supplied to the container by means of an inlet of the treatment device provided in an upper area of the container and disposed outward in a radial direction with respect to the longitudinal axis and the liquid essentially containing the organic solids being discharged from the container by means of an outlet of the treatment device provided in the upper area, a deposit of essentially the inorganic, mineral solids being formed in a lower area of the container disposed adjacent to a center area of the container in the direction of the longitudinal axis, which is disposed adjacent to the upper area in the direction of the longitudinal axis, the inorganic, mineral solids forming the deposit being discharged by means of a discharge apparatus of the treatment device which is tethered to the lower area, the mixture, which has been guided to the container via the inlet, being guided between an outer wall of the sleeve and an inner wall of the container from the upper area to the center area and the liquid containing the organic solids being guided from the center area to the upper area by at least partially traversing an interior of the sleeve limited by an inner wall of the sleeve for being discharged from the outlet by means of a sleeve, which is disposed in the upper area, extends in the direction of the longitudinal axis, forms a guide apparatus, and is open to both sides.

Advantageously, a flow of the mixture can be made more even between the outer wall of the sleeve and the inner wall of the container and a flow speed of the mixture can be reduced.

Moreover, the liquid containing the organic solids can flow to the upper area inward in the radial direction in the opposite direction of the longitudinal axis in the center area. Consequently, the center area can comprise a radially outward area and a radially inward area, the mixture being able to flow downward in the longitudinal direction from the upper area in the radially outward area and the liquid containing the organic solids being able to flow to the upper area in the opposite direction of the direction of the longitudinal axis in the radially inner area.

Advantageously, the liquid containing the organic solids can flow into a drain channel of the treatment device, the drain channel being partially disposed in the sleeve, being tethered to the outlet, protruding over the sleeve in the opposite direction of the direction of the longitudinal axis, forming essentially an annulus having a smaller diameter than a diameter of the sleeve and forming both sides of the overflow weir.

Advantageously, the mixture can be supplied to the container below a mixture level or liquid level formed in the container.

Further advantageous embodiments of the method are derived from the description of features of the dependent claims referring to device claim 1.

BRIEF DESCRIPTION OF THE DRAWING FIGURES

In the following, preferred embodiments of the invention are described in more detail with reference to the attached drawings.

DETAILED DESCRIPTION

A combined view of FIGS. 1 to 8 shows a treatment device 10, which comprises a container 11 for receiving a mixture (not shown) made up of at least a liquid, organic solids and inorganic, mineral solids, container 11 being formed so as to taper in a funnel shape in a direction 18 (shown in FIG. 6) of a longitudinal axis 12 (also shown in FIG. 6) of container 11. Furthermore, treatment device 10 comprises a frame 41, on which container 11 is disposed, and a discharge apparatus 33 for discharging a deposit 19 (shown in FIG. 8) formed by the inorganic, mineral solids. Discharge apparatus 33 comprises a screw conveyor 34, which is driven by drive means 35 of discharge device 33. Furthermore, discharge device 33 comprises a drop channel 36 on one end, by means of which the dropped inorganic, mineral solids cleaned of organic solids can be dropped into a collecting container (not shown) disposed below drop channel 36.

Figure 1:
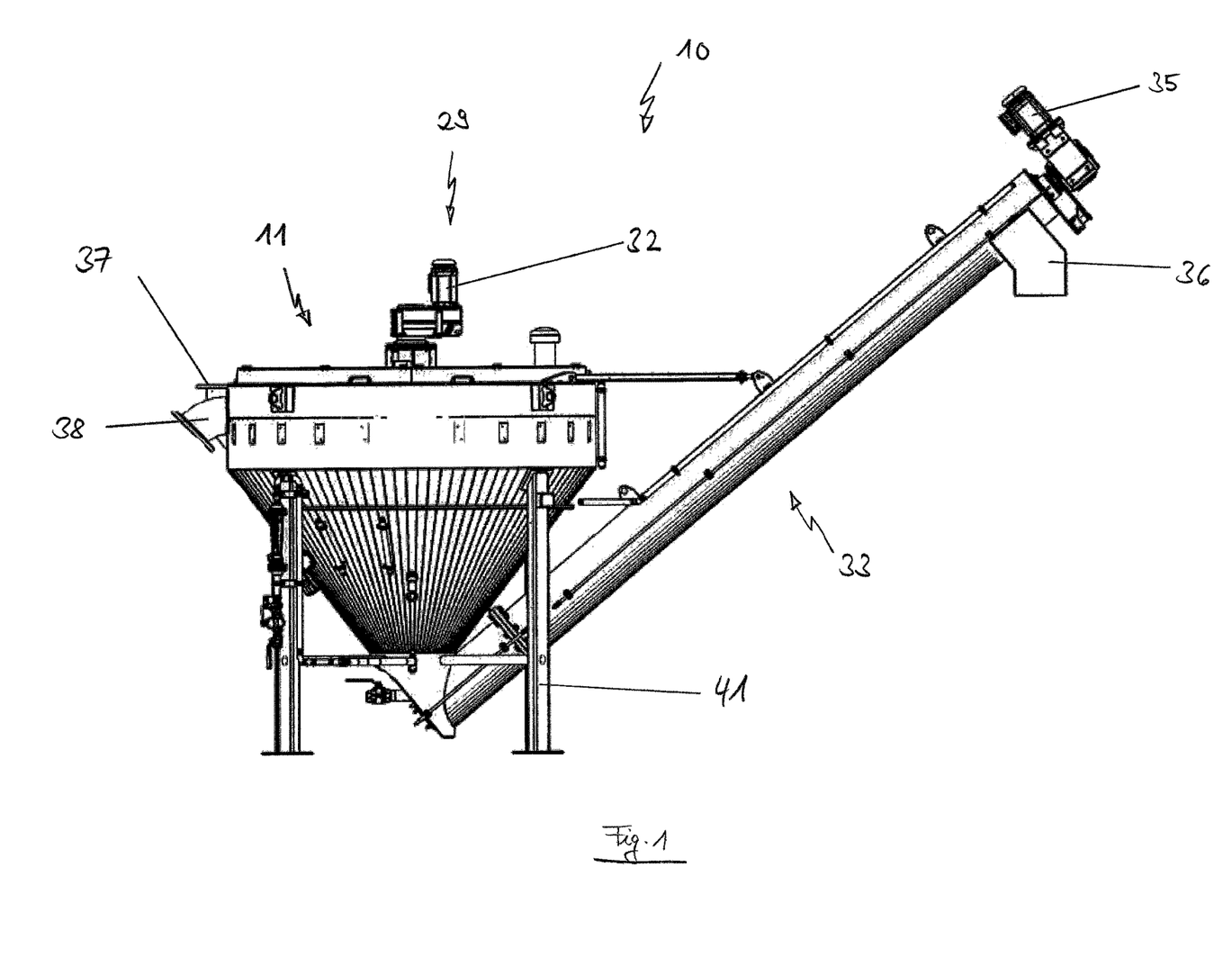
FIG. 1 shows a lateral view of a treatment device.
Figure 2:
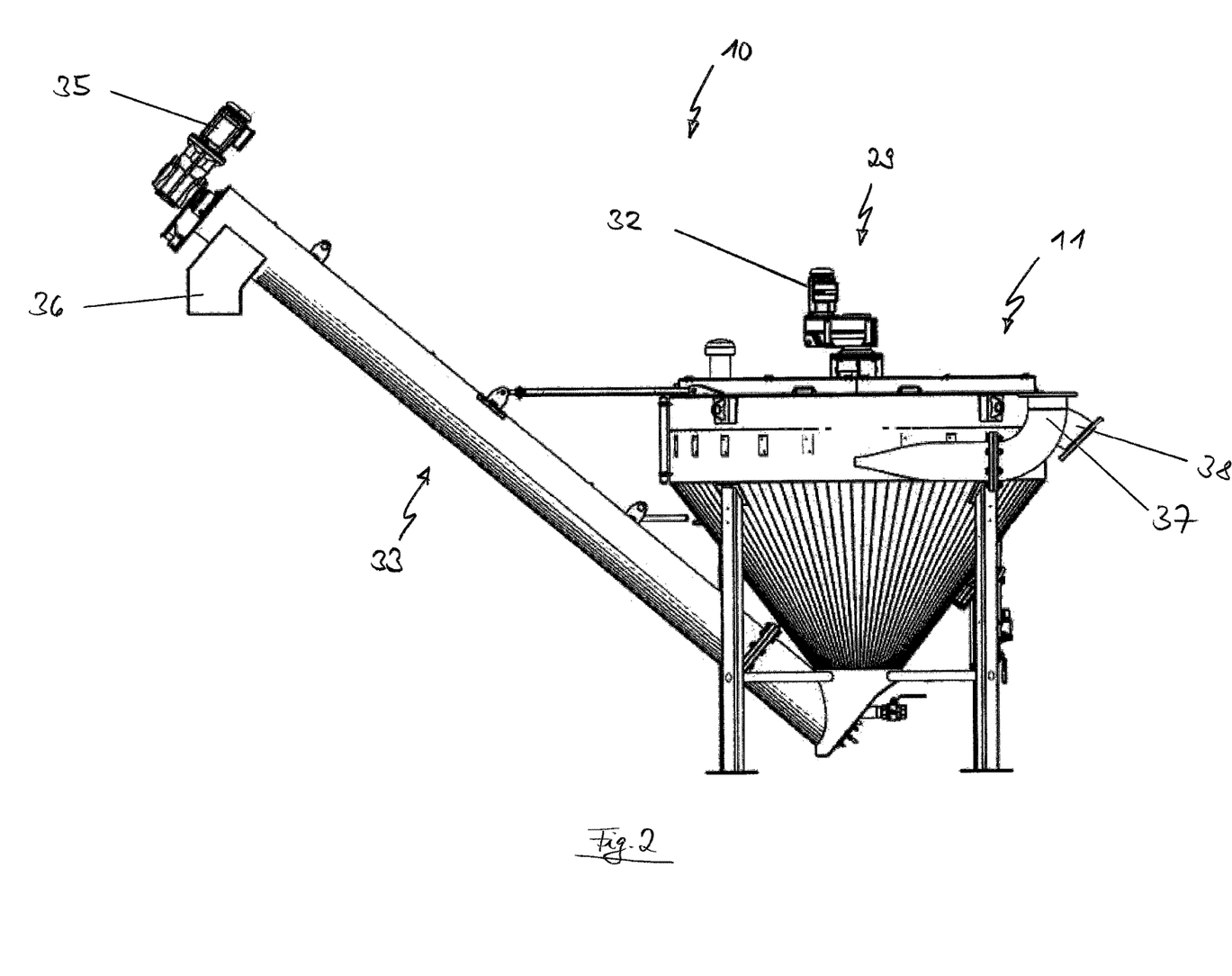
FIG. 2 shows another lateral view of the treatment device.
Figure 3:
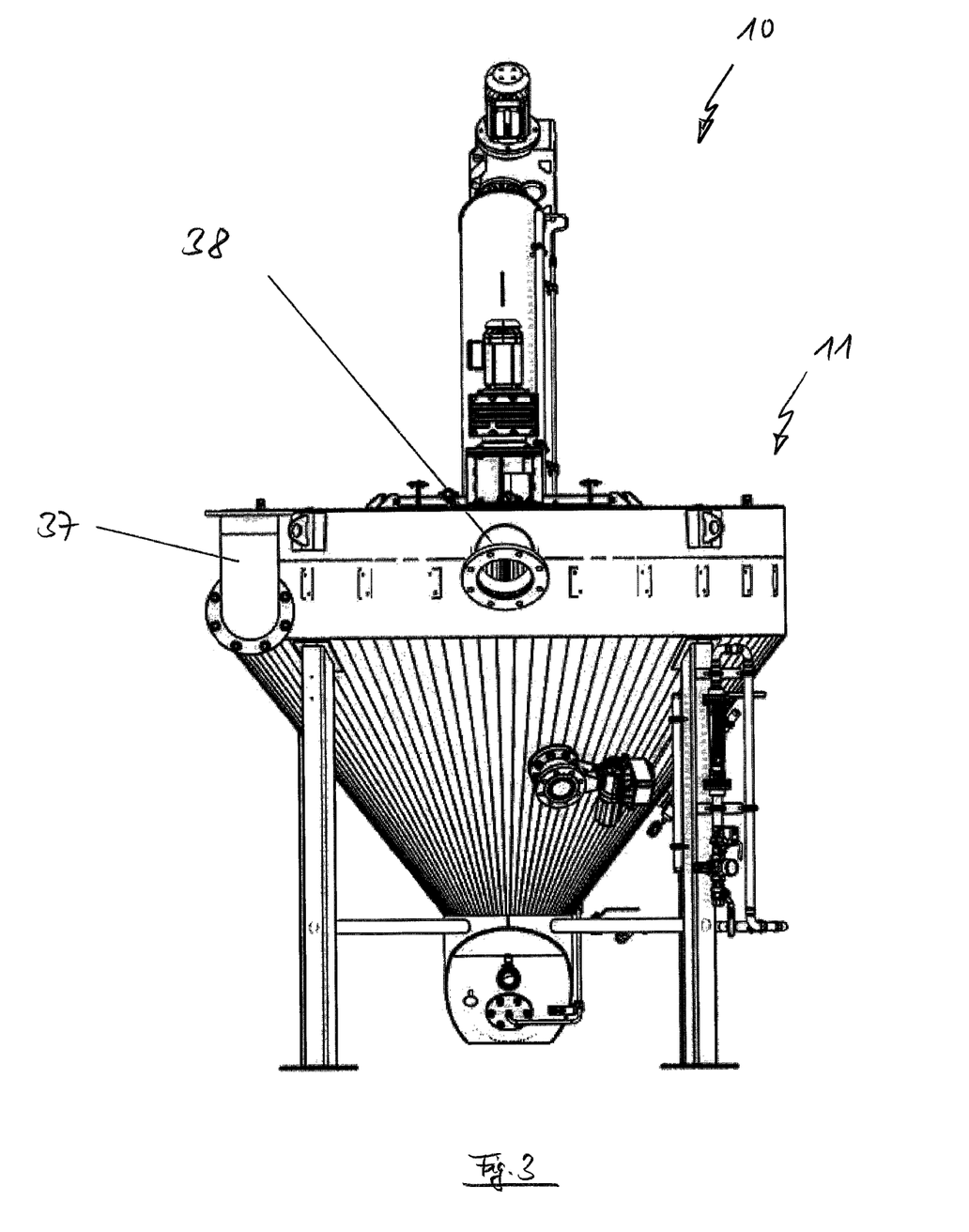
FIG. 3 shows a front view of the treatment device.
Figure 4:
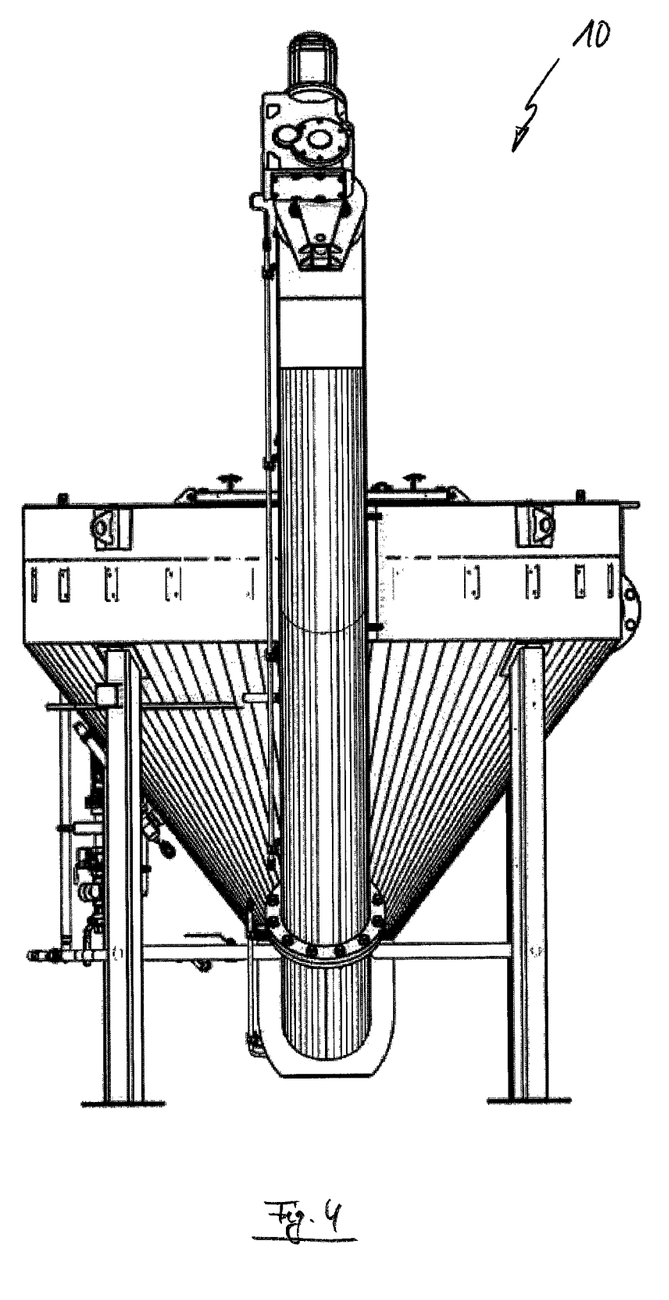
FIG. 4 shows a rearview of the treatment device.
Figure 5:
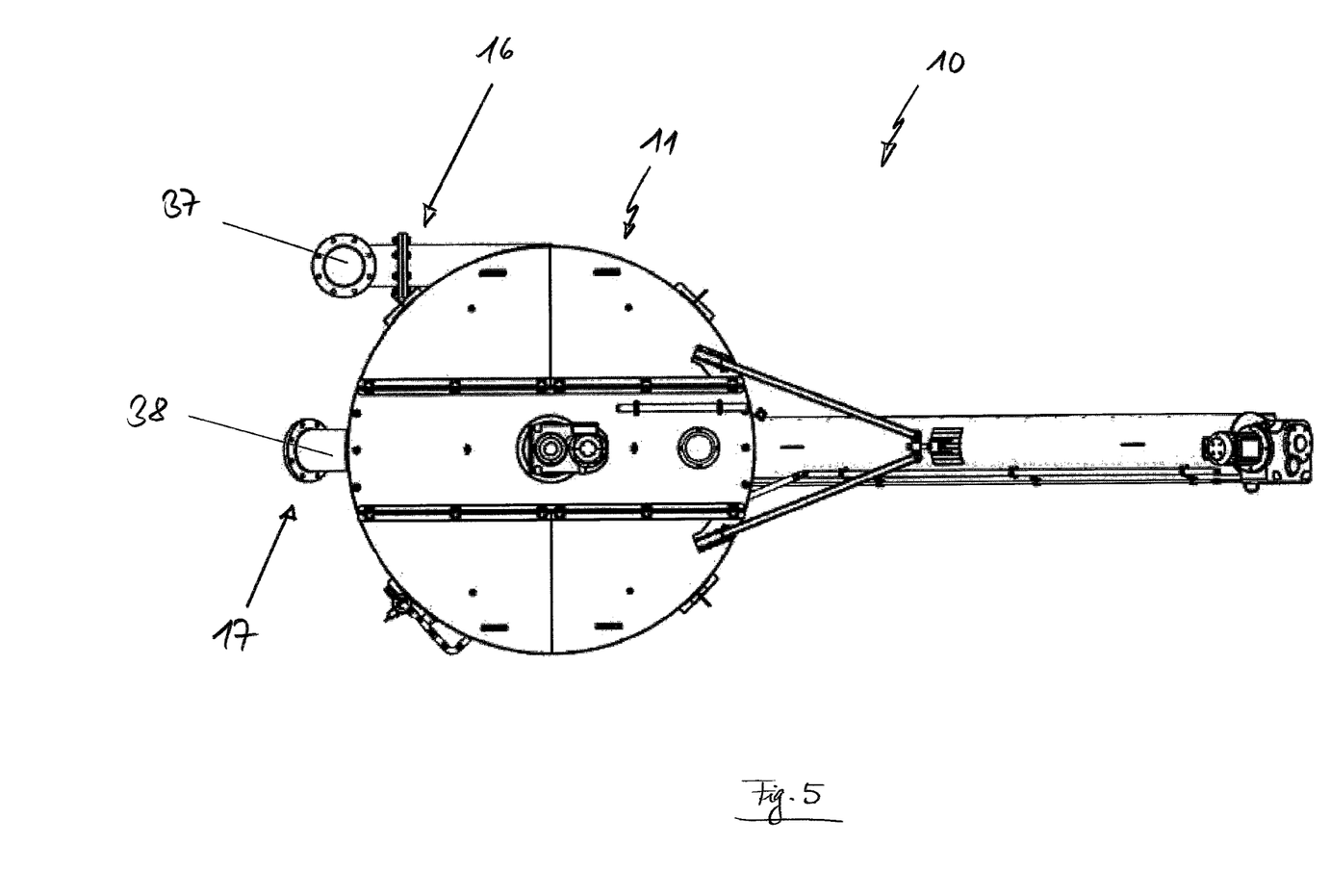
FIG. 5 shows a top view of the treatment device.
Figure 6:
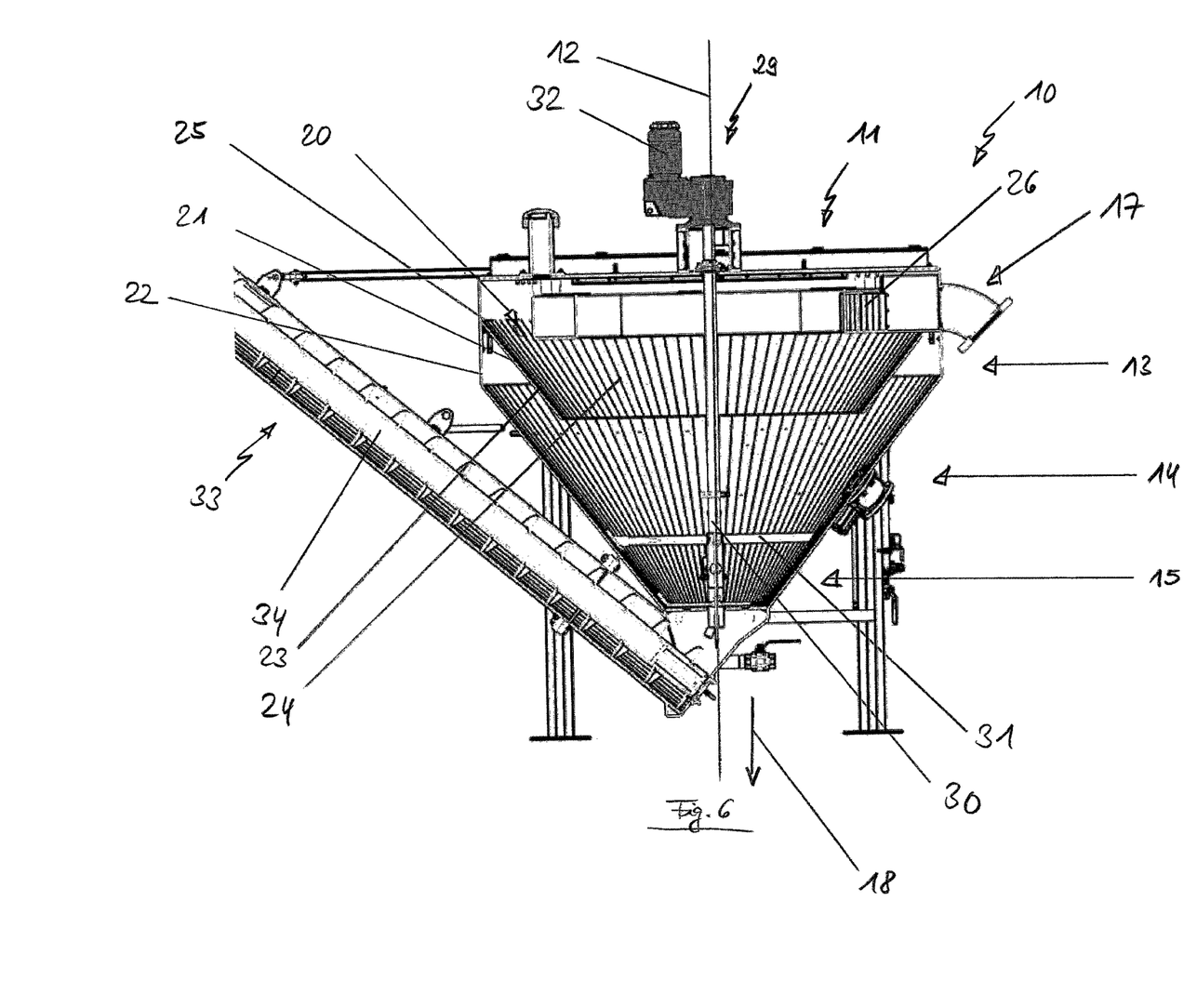
FIG. 6 shows a lateral cut view of the treatment device.

As shown in FIG. 6, container 11 has an upper area 13, a center area 14 and a lower area 15. In upper area 13, an inlet 16 of treatment device 10 situated on the outside in radial direction 42 (shown in FIG. 7) with respect to longitudinal axis 12 for tangentially supplying the mixture to container 11 and an outlet 17 of treatment device 10 for discharging the liquid containing essentially the organic solids are provided. Inlet 16 has an inlet flange 37, while outlet 17 has an outlet flange 38. Furthermore, outlet 17 is disposed at an offset to inlet 16 by an angle of 90° in an azimuthal direction 40 (shown in FIG. 7) with respect to longitudinal axis 12.

Moreover, treatment device 10 comprises a stirring apparatus 29 having a stirring element carrier 30 (shown in FIG. 6) aligning flush with longitudinal axis 12 and stirring elements 31 (shown in FIGS. 6 and 7) disposed on stirring element carrier 30 in lower area 15, in which deposit 19 is formed. Furthermore, stirring apparatus 29 comprises drive means 32, by means of which stirring element 30 can be set to rotate.

Figure 7:
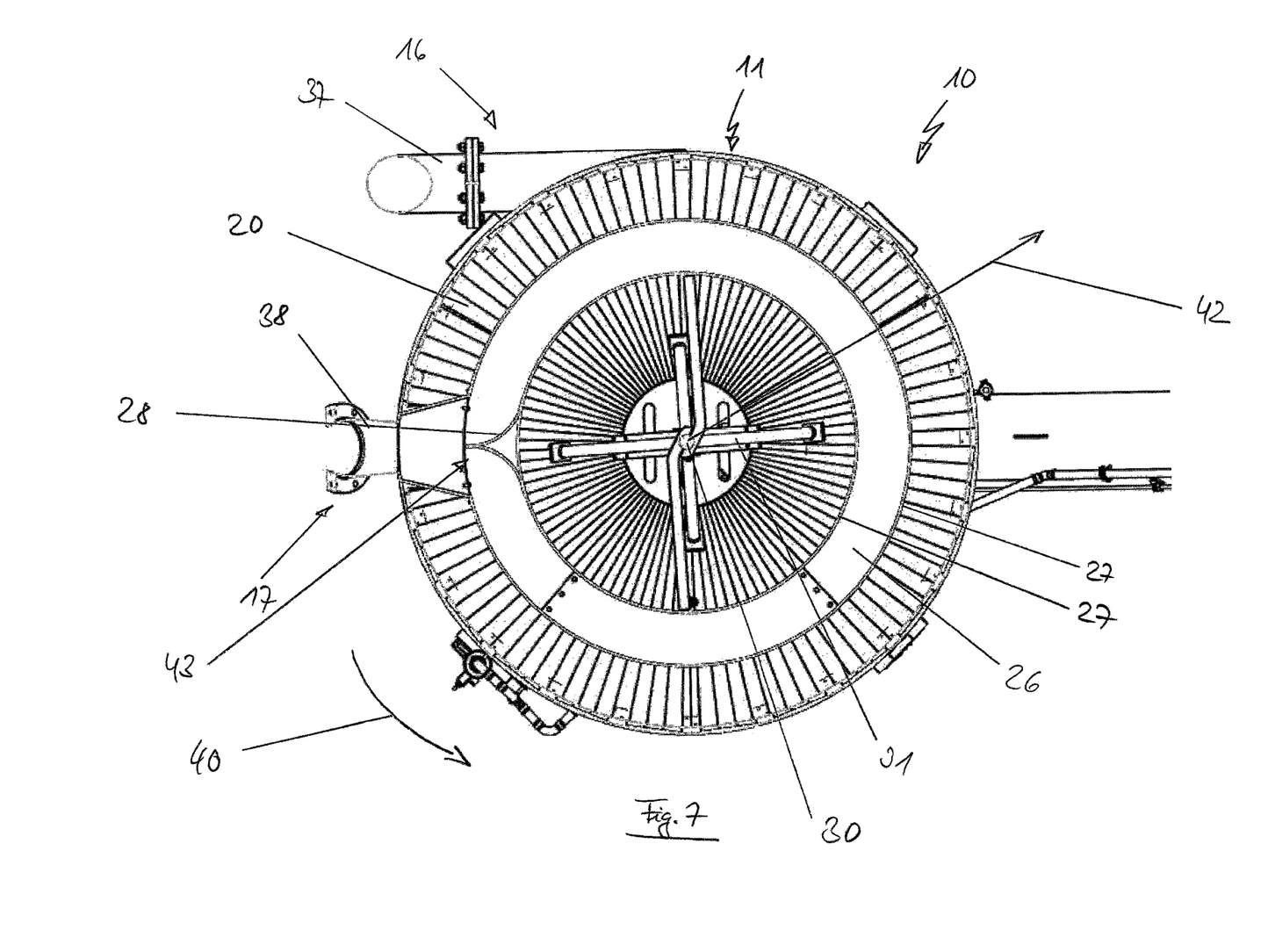
FIG. 7 shows a top cut view of the treatment device.
Figure 8:
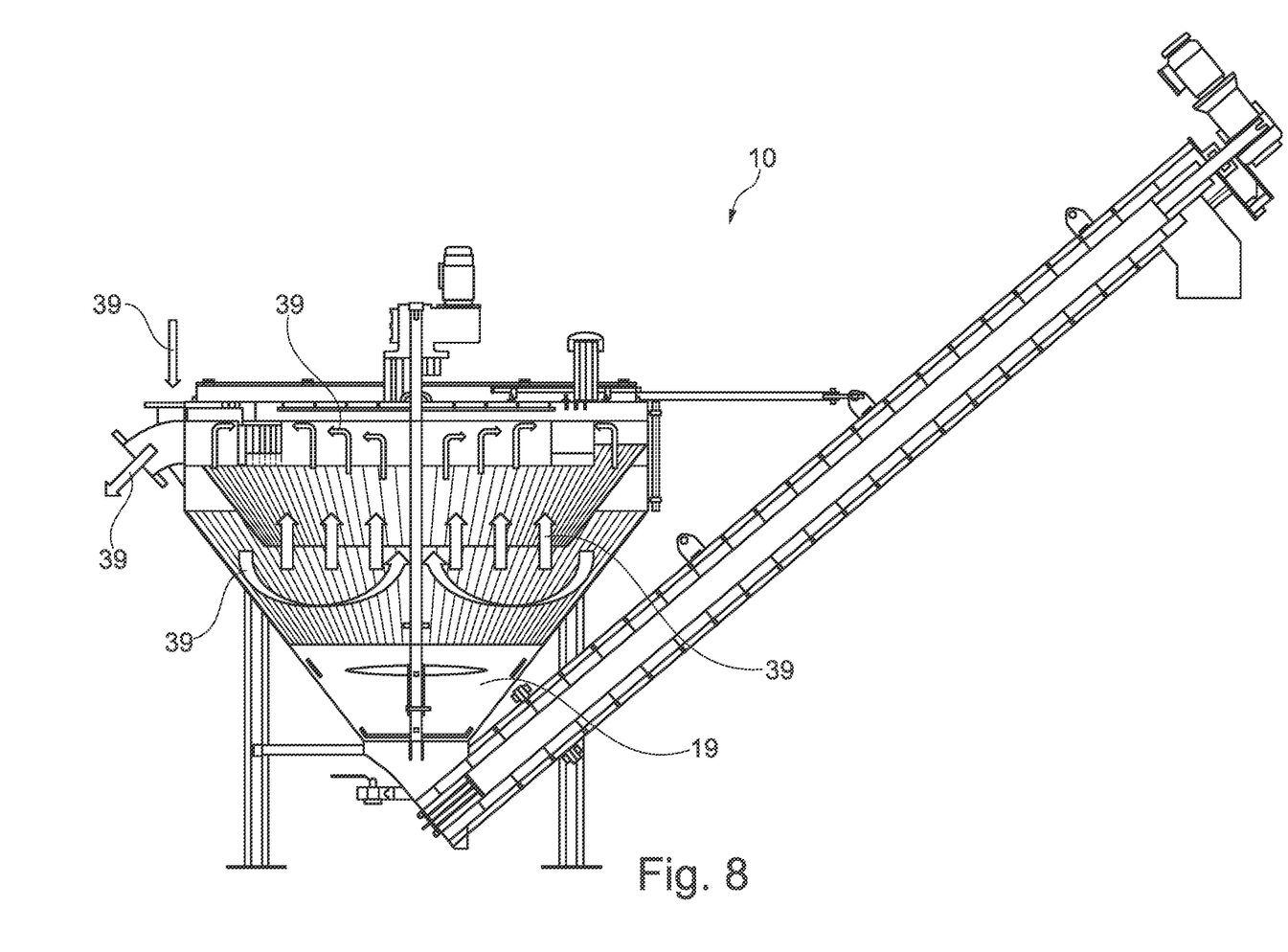
FIG. 8 shows a lateral cut view of the treatment device, which shows a flow course.

As FIGS. 6 to 8 show, treatment device 10 comprises a sleeve 20 in upper area 13, sleeve 20 extending in direction n18 of longitudinal axis 12 and forms a guide apparatus. Sleeve 20 is open on both sides and is designed so as to taper in direction 18 of longitudinal axis 12 and is frustoconical. Sleeve 20 is configured to guide the mixture, which has been guided to container 11 via inlet 16, between an outer wall 21 of sleeve 20 and an inner wall 22 of container 11 from upper area 13 to center area 14 and to guide the liquid containing the organic solids from center area 14 to upper area 13 by at least partially traversing an interior 24 of sleeve 20 limited by an inner wall 23 of sleeve 20 for being discharged from the outlet. In this context, the liquid containing the organic solids flows to upper area 13 in center area 14 inward in radial direction 42, in the opposite direction of direction 18 of longitudinal axis 12. After the liquid containing the organic solids has traversed sleeve 20, it flows in an annular drain channel 26 of treatment device 10 disposed partially in sleeve 20, tethered to drain 17, protruding over sleeve 20 in the direction opposite direction 18 of longitudinal axis 12, forming both sides of overflow weir 27. A flow behavior of the mixture or of the liquid containing the organic solids is represented by arrows 39 in FIG. 8. Drain channel 26 has two arc-shaped guide elements 28 in an area 43 of drain channel 26, which is tethered to drain 17, guide elements 28 being configured to guide the liquid containing the organic solids to drain 17 from drain channel 26.

Container 11, sleeve 20 and drain channel 26 are disposed coaxially to one another with respect to longitudinal axis 12.

Furthermore, a diameter (now shown) of drain channel 26 is smaller than a diameter (not shown) of sleeve 20.

Sleeve 20 abuts on the outside of inner wall 22 of container 11 in a liquid-tight manner in radial direction 42 with an end 25 of sleeve 20 in the opposite direction of direction 18 of longitudinal axis 12. Inlet 16 is on a level with sleeve 20. Furthermore, inlet 16 is adjacent, i.e., below outlet 17, in direction 18 of longitudinal axis 12.

The advantageous combination of sleeve 20 forming the guide apparatus with annular drain channel 26, which forms overflow weir 27 on both sides, enables attaining a sand removal of 95% for a grit size of approximately 100 μg and larger using treatment device 10 at an essentially unchanged loading.

The invention claimed is:

1. A treatment device for treating a mixture made up of at least a liquid, organic solids and inorganic, mineral solids, and separating the inorganic, mineral solids contaminated with organic solids from the liquid, the treatment device comprising a container adapted for receiving the mixture, wherein the container (a) tapers in a funnel shape in a first direction of a longitudinal axis of the container, (b) has an upper area including an inlet, situated on the outside in a radial direction with respect to the longitudinal axis and adapted for tangentially supplying the mixture to the container, and an outlet, adapted for discharging the liquid essentially containing the organic solids from the container, (c) a center area, disposed adjacent to the upper area in the first direction of the longitudinal axis, and a lower area, disposed adjacent to the center area in the first direction of the longitudinal axis and adapted for forming a deposit made of essentially the inorganic, mineral solids; and
- a discharge apparatus tethered to the lower area and adapted for discharging the inorganic, mineral solids forming the deposit,
- wherein the treatment device further includes a sleeve, disposed in the upper area, and extending in the first direction of the longitudinal axis, open to both sides and configured to guide the mixture between an outer wall of the sleeve and an inner wall of the container from the upper area to the center area and to guide the liquid, containing the organic solids, from the center area to the upper area, at least partially traversing an interior of the sleeve limited by an inner wall of the sleeve, for being discharged from the outlet.

2. The treatment device according to claim 1, wherein the sleeve is hollow-conical and tapered in the first direction of the longitudinal axis.

3. The treatment device according to claim 2, wherein the sleeve and the container are disposed coaxially to one another with respect to the longitudinal axis.

4. The treatment device according to claim 1, wherein the inlet is disposed adjacent to the sleeve.

5. The treatment device according to claim 4, wherein the inlet is disposed adjacent to the outlet in the first direction of the longitudinal axis.

6. The treatment device according to claim 4, wherein the outlet is disposed on the outside in the radial direction.

7. The treatment device according to claim 4, wherein the sleeve abuts, preferably in a liquid-tight manner, on the outside of the inner wall of the container in the radial direction with an end of the sleeve situated in a second direction of the longitudinal axis, wherein the second direction is opposite the first direction.

8. The treatment device according to claim 7,
wherein the treatment device further includes a drain channel disposed at least partially in the sleeve and tethered to the outlet and forming an overflow weir.

9. The treatment device according to claim 8, wherein the drain channel protrudes over the sleeve in the second direction of the longitudinal axis.

10. The treatment device according to claim 9, wherein the drain channel forms an annulus.

11. The treatment device according to claim 10, wherein a diameter of the drain channel is smaller than a diameter of the sleeve, the drain channel forming both sides of the overflow weir.

12. The treatment device according to claim 11, wherein the drain channel and the container are disposed coaxially to one another with respect to the longitudinal axis.

13. The treatment device according to claim 12, wherein the drain channel has a guide element tethered to the outlet in an area of the drain channel and adapted to guide the liquid containing the organic solids from the drain channel to the outlet.

14. The treatment device according to claim 13, wherein the treatment device further includes a stirring apparatus having a stirring element carrier, aligned flush with the longitudinal axis, and at least one stirring element disposed on the stirring element carrier in the lower area.

15. The treatment device according to claim 14, wherein the treatment device is a grit grader or grit classifier.

16. A method for treating a mixture made up of at least a liquid, organic solids and inorganic, mineral solids, and separating inorganic, mineral solids contaminated with the organic solids from the liquid, by means of a treatment device, the method comprising:
- receiving the mixture in a container of the treatment device, by tangentially supplying the mixture to the container through an inlet of the treatment device provided in an upper area of the container and situated on the outside in a radial direction with respect to a longitudinal axis of the container;
- discharging the liquid containing the organic solids from the container through an outlet of the treatment device provided in the upper area;
- depositing the inorganic, mineral solids in a lower area of the container disposed adjacent to a center area of the container;
- discharging, by a discharge apparatus of the treatment device the inorganic, mineral solids; and
- guiding, by a sleeve, the mixture, between an outer wall of the sleeve and an inner wall of the container from the upper area to the center area and guiding, by the sleeve, the liquid containing the organic solids from the center area to the upper area by at least partially traversing an interior of the sleeve limited by an inner wall of the sleeve for being discharged from the outlet.

17. The method according to claim 16, further including maintaining a constant flow of the mixture and reducing a flow speed of the mixture between the outer wall of the sleeve and the inner wall of the container.

18. The method according to claim 17, further including directing the flow of the liquid containing the organic solids to the upper area in the center area on the inside in the radial direction.

19. The method according to claim 18, further including directing the flow of the liquid containing the organic solids to a drain channel of the treatment device, the drain channel being (a) disposed at least partially in the sleeve, (b) tethered to the outlet, (c) forming an annulus having a smaller diameter than a diameter of the sleeve and (d) forming both sides of an overflow weir.

20. The method according to claim 19, further including supplying the mixture to the container below a mixture level or liquid level formed in the container.

* * * * *